United States Patent [19]
Greil et al.

[11] Patent Number: 5,066,089
[45] Date of Patent: Nov. 19, 1991

[54] ARRANGEMENT FOR OPTICALLY COUPLING LIGHT BETWEEN AN ELECTRO-OPTICAL TRANSDUCER AND A LIGHT WAVEGUIDE

[75] Inventors: Andreas Greil, Munich; Joachim Bialas, Deisenhofen, both of Fed. Rep. of Germany

[73] Assignee: Siemens Aktiengesellschaft, Munich, Fed. Rep. of Germany

[21] Appl. No.: 522,118

[22] Filed: May 11, 1990

[30] Foreign Application Priority Data

May 29, 1989 [XH] Hague .............................. 89 109671

[51] Int. Cl.⁵ .............................................. G02B 6/32
[52] U.S. Cl. .................................................... 385/35
[58] Field of Search ............... 350/96.15, 96.17, 96.18, 350/96.20; 250/227.14, 227.15, 227.27, 227.24, 552; 357/17, 19, 30, 74, 80

[56] References Cited

U.S. PATENT DOCUMENTS 4,705,351 11/1987 Toda ................................. 350/96.18
4,737,008 4/1988 Ohyama et al. .................. 350/96.20
4,767,171 8/1988 Keil et al. ......................... 350/96.18

OTHER PUBLICATIONS

Journal of Optical Communications, 9 (1988), pp. 42–49, No. 2, Jun., "Laser Diode to Single-Mode Fiber Coupling with Ball Lenses".

Primary Examiner—Frank Gonzalez
Assistant Examiner—Phan T. Heartney
Attorney, Agent, or Firm—Hill, Van Santen, Steadman & Simpson

[57] ABSTRACT

An arrangement for optically coupling an electro-optical transducer module to a light waveguide uses two lenses wherein the first lens is arranged in front of the electro-optical transducer module axially offset relative to the axis of the transducer module and a second lens is arranged in front of the light waveguide axially offset relative to the optical axis thereof. The optical axes of the two lenses are also axially offset relative to one another so that disturbing back-reflections are drastically reduced without diminishing the coupling efficiency of the arrangement.

6 Claims, 1 Drawing Sheet

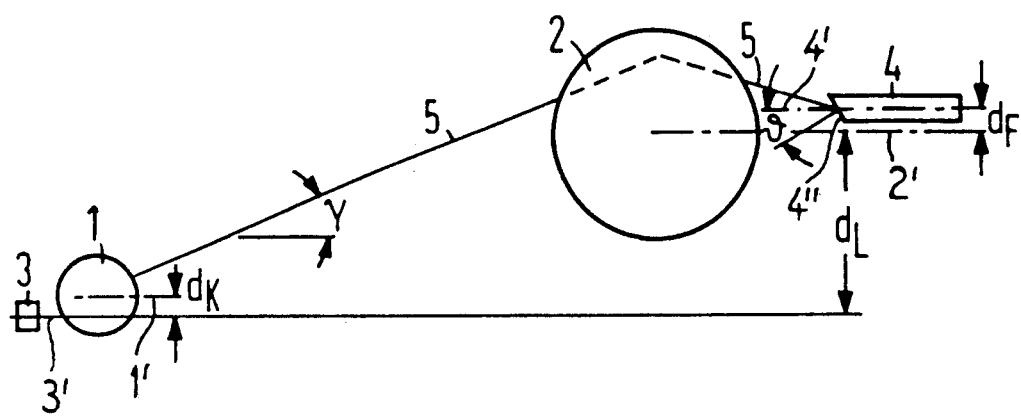

ARRANGEMENT FOR OPTICALLY COUPLING LIGHT BETWEEN AN ELECTRO-OPTICAL TRANSDUCER AND A LIGHT WAVEGUIDE

BACKGROUND OF THE INVENTION

1. Field of the Invention

The present invention is directed generally to an arrangement for optically coupling light between an electro-optical transducer module and a light wave guide using two lenses.

2. Description of the Related Art

Electro-optical transducer modules are used for optical message transmissions, among other things. Transmission and/or receiver modules must be optically coupled to a light wave guide which is, for example, a monomode optical fiber transmission path.

It is known to use coupling optics between a monomode light waveguide and electro-optical components. Such coupling optics may include a first lens in front of a laser diode, which serves as a transmitter, and a second lens arranged in front of the light waveguide. The lenses and the optical fiber lie on an axis defined by the beam path of the laser diode.

The surfaces of such coupling optics act as mirroring, or at least partially reflective, surfaces which cause a back-reflection of a portion of the laser emission that causes disturbances in the light power and/or phase of the laser emission. As a result of such back reflection, the bit error rate in a message transmission system may be increased.

The back-reflection from the surfaces of the optical elements also occurs in receiver modules having an optical lens for optically coupling between the light waveguide fiber and, for example, a photodiode which serves as the receiver. The light reflections from this coupling optics can also disturb the laser.

The known measures for suppressing the disturbing back reflections using either an anti-reflection coating or an optical isolator are inadequate and also raise the costs of such arrangements.

SUMMARY OF THE INVENTION

An object of the present invention is to reduce the disturbing back-reflections in an arrangement for optically coupling an electro-optical transducer module to a light waveguide using two lenses, without disturbing the coupling efficiency of the arrangement and, which moreover, is easily and inexpensively realized.

This and other objects and advantages of the invention are achieved by an arrangement having a first lens arranged with its optical axis axially offset compared to the optical axis of the electro-optical transducer module, and second lens arranged with its optical axis axially offset relative to the optical axis of a light waveguide, and the optical axes of the first and second lenses being axially offset relative to one another.

Advantageous developments and improvements of the invention are provided by the arrangement in which both lenses are spherical lenses. In addition, the end face of the light waveguide which is directed toward the second lens is inclined at a bevel angle or ground angle relative to the optical axis thereof. The ground angle or bevel angle at the end face of the light waveguide relative to the optical axis thereof preferably is up to approximately 7°.

A squint angle is formed between the axis of the light waveguide and the axis of the light beam emerging from the first lens, wherein the squint angle amounts to up to approximately 8° and is dependent upon the axially offset of the light waveguide relative to the second lens and on the bevel angle of the end face of the light waveguide. For a prescribed bevel angle dependent upon the squint angle, the magnitudes of the axial offset of the second lens to the light waveguide, of the axial offset of the first lens to the electro-optical transducer module, and the axial offset of the two lenses relative to one another are adjustable for optimum coupling efficiency with a minimum of back-reflection.

The advantages achieved with the present invention are particularly comprised wherein the disturbing back-reflections are dramatically diminished by non-axial coupling. The two lense and the light waveguide fiber no longer lie along the axis defined by the radiation axis of the laser diode.

With the present arrangement, there is little reduction in the coupling efficiency. The present invention is easy to realize in technical terms and results in no additional cost being incurred.

BRIEF DESCRIPTION OF THE DRAWINGS

The Figure shows a schematic arrangement of a preferred exemplary embodiment of the optical-coupling arrangement of the present invention.

DESCRIPTION OF THE PREFERRED EMBODIMENTS

The Figure shows an arrangement of lens coupling optics which is essentially composed of an electro-optical transducer module 3 that is, for the present example, a light transmitter in the form of a laser diode. The transducer module 3 generates optical radiation in the form of a beam along an axis 3' which is to be couple into a light waveguide 4 in the form of, for example, a monomode optical fiber. Included in the arrangement are two lenses 1 and 2 which are preferably spherical lenses. The first lens 1 is arranged in front of the electro-optical transducer module 3 and the second lens 2 is allocated to the light waveguide 4. The first and second lenses 1 and 2 are arranged in a beam path 5. An optical axis 1' of the first lens 1 is axially offset relative to the optical axis 3' of the electro-optical transducer module 3 by a distance $d_k$, and an optical axis 2' of the second lens 2 is axially offset relative to an optical axis 4' of the light waveguide 4 by an amount $d_F$. Moreover, the optical axes 1' and 2' of the two lenses 1 and 2 arranged in the beam path 5 between the transducer module 3 and the optical fiber 4 are axially offset relative to one another by a distance $d_L$.

To diminish the reflections of the end face 4" of the light waveguide 4 facing toward the second lens 2, the end face 4" is preferably beveled by expediently providing an oblique grinding, for example. Due to the advantageous beveling of the end face 4" of the light waveguide 4, the normal to the end face 4" forms a ground angle $v$ with the optical axis 4' of the waveguide 4. To diminish the back-reflection from the end face 4" of the fiber 4 by approximately 80 dB, a ground angle $v$ of approximately 7° is adequate.

An angle $\gamma$, referred to here as a squint angle, described between the axis 4' of the light waveguide 4 and an axis or direction of the light beam path 5 emerging from the first lens 1 expediently is up to 8°. The squint angle $\gamma$ is thereby dependent on the ground angle $v$ and on the axial offset $d_F$ of the optical axis 4' of the light waveguide 4 relative to the optical axis 2' of the second lens 2 allocated thereto.

The present invention is advantageously constructed so that, for a given ground angle $\nu$, the sizes of the axial offset $d_F$ of the light waveguide 4, of the axial offset $d_K$ of the electro-optical transducer module 3 and the axial offset $d_L$ of the lenses 1 and 2 are adjustable to achieve a maximum coupling efficiency with a minimum of back-reflection.

In an arrangement having an axial beam direction and no beveling of the fiber end face of the light waveguide ($\gamma=0$, $\nu=0$, $d_F=0$) then a back-reflection of, for example, $-18dB$ arises at the end face of the fiber with reference to the mirror power of the laser diode. By providing a bevelling on the fiber end face of approximately 4°, a significant suppression of the reflection to $-40dB$ is achieved. By readjusting the axial offset $d_F$ to, for example, approximately 10 micrometers, the coupling efficiency between the laser and the fiber is prevented from deteriating.

A further adjustment possibility for the present invention is that the spacing of the electro-optical transducer module 3 from the first lens 1, of the first lens 1 from the second lens 2, and of the light waveguide 4 from the second lens 2 can be varied. Such variation can depend on, for example, the core diameter of the light waveguide fiber 4 used and/or on the luminous spot of the laser diode used, so that the arrangement can always be adjusted to achieve a maximum light in-coupling for every application.

Thus there has been shown and described an arrangement for an optical coupling which dramatically reduces disturbing back-reflections without diminishing the coupling efficiency. The present coupling arrangement is particularly useful in electro-optical transducer modules.

Although other modifications and changes may be suggested by those skilled in the art, it is the intention of the inventors to embody within the patent warranted hereon all changes and modifications as reasonably and properly come within the scope of their contribution to the art.

We claim:

1. An arrangement for optically coupling an electro-optical transducer to a light waveguide, comprising:
   first and second lenses each having an optical axis, said first lens being arranged in front of the electro-optical transducer and said second lens being arranged in front of the light waveguide, said optical axis of said first lens being axially offset relative an optical axis of the electro-optical transducer, said optical axis of said second lens being axially offset relative to an optical axis of the light waveguide, said optical axis of said first lens being offset relative to said optical axis of said optical axis of said second lens, and
   an end face of the light waveguide directed toward said second lens is being inclined at a bevel angle relative to the optical axis of the light waveguide.

2. An arrangement as claimed in claim 1, wherein both of said first and second lenses are substantially spherical lenses.

3. An arrangement as claimed in claim 1, wherein said bevel angle of said end face of the light waveguide is up to approximately 7 degrees.

4. An arrangement as claimed in claim 1, wherein said first lens is arranged to provide a squint angle of up to 8 degrees between an axis of a light beam leaving said first lens and the optical axis of the light waveguide.

5. An arrangement as claimed in claim 4, wherein said squint angle is dependent upon an axial offset of the light waveguide and on a bevel angle of an end face of the light waveguide.

6. An arrangement as claimed in claim 1, wherein, for a prescribed squint angle, a magnitude of the axial offset between the electro-optical transducer and said first lens, a magnitude of the axial offset between said second lens and the light waveguide, and a magnitude of the axial offset between said first and second lenses are variable to achieve an optimum efficiency and a minimum back-reflection.

* * * * *